United States Patent Office 3,806,497
Patented Apr. 23, 1974

3,806,497
POLYMERIZATION TERMINATION WITH SULFUR, SELENIUM, OR TELLURIUM HYDRIDE
Richard J. Sonnenfeld, and Alvin C. Rothlisberger, Bartlesville, Okla., assignors to Phillips Petroleum Company
No Drawing. Filed Mar. 3, 1972, Ser. No. 231,733
Int. Cl. C08d 3/08, 5/02; C08f 19/08
U.S. Cl. 260—84.1                        13 Claims

ABSTRACT OF THE DISCLOSURE

Group VI-A hydrides, sulfur hydride, selenium hydride, or tellurium hydride, employed as polymerization terminating agents or shortstops for conjugated diene polymerization systems initiated with organometal/transition metal compound catalyst systems, produce polymeric products exhibiting reduced cold flow and other improved properties.

FIELD OF THE INVENTION

This invention relates to the termination of conjugated diene polymerization systems.

BACKGROUND OF THE INVENTION

Polymers of conjugated dienes, such as polybutadiene, are produced in large quantities for a variety of applications, such as automotive tire usage. However, in the processing of these polymers, and in packaging and shipping, some difficulties have been experienced which are attributable to the tendency of the polymer to cold flow while in the unvulcanized state. Thus, if any minor crack or puncture develops in the polymer package during shipment or storage, the polymer may tend to flow from the package with resulting economic loss, contamination, or sticking together of packages. Reduction of cold flow while maintaining overall properties of the polymer certainly is a most desirable objective.

OBJECTS OF THE INVENTION

It is an object of this invention to improve cold flow of polymers of conjugated dienes. It is another object of the invention to provide a new method of terminating polymerization processes. A further object of the invention is a method of improving the physical appearance of polymer products.

Other objects of the invention will become apparent to those skilled in the art to which the invention most nearly appertains upon consideration of the disclosure including the specification and claims.

SUMMARY OF THE INVENTION

Group VI-A hydrides, specifically sulfur, selenium, and tellurium hydrides, are employed as polymerization termination agents or shortstops for conjugated diene polymerization processes initiated with organometal/transition metal-compound catalyst system. The so-terminated unvulcanized polymers of conjugated dienes have desirably low cold flow, and, in addition, exhibit a desirably light color.

The hydride quenching agents have several advantages over many prior art cold flow reducing agents. For example, their normally gaseous nature permits ease of charging the quenching agent to the polymerization mixture in which a homogeneous mixture can be quickly and easily formed, thereby preventing side reactions which might be caused by localized high concentrations of quenching agent in the polymerization mixture. Furthermore, the gaseous nature of the quenching agents also enables their essentially complete removal from recycle diluent and monomer, and prevent problems with contamination of fresh charge of monomers and diluent to the polymerization system. Many prior art quenching agents suffer from the disadvantage that their boiling point is such that they tend to accumulate in the recycle stream of hydrocarbon diluent or monomer employed in polymerization systems.

DETAILED DESCRIPTION OF THE INVENTION

The hydrides employed in the process of this invention are those of elements of Group VI-A of the Periodic Table as set forth in Handbook of Chemistry and Physics, 49th Ed. (1968–1969), the Chemical Rubber Company, Cleveland, Ohio, page B-4. The hydrides are those of elements in the third through the fifth periods, more specifically those of sulfur, selenium, and tellurium.

The hydride quenching or shortstopping agent can be added to the polymerization system at any stage in the polymerization after initiation. Where desired, portions of the hydride terminating agent can be added periodically, incrementally or continuously, during all or a part of the polymerization reaction, in order to provide a polymer product of broadened molecular weight distribution, so long as the amount so added is insufficient to quench effective catalyst activity when it is desired that the polymerization continue. Thus, the agent can be added at any desired level or degree of conversion, although presently it is preferred to add the hydride after at least about 60 to 80 or greater percent conversion of monomers has been attained. Since unconverted, i.e., unpolymerized, monomer, as well as polymerization diluent used, if any, can be separated and recycled to the polymerization system, it is unnecessary for the conversion of monomer to be essentially quantitative prior to the addition of the hydride. The hydride terminating agent can be added, if desired, after essentially all of the monomer or monomers have been consumed in the polymerization step.

The amount of hydride terminating agent employed, one or other, or mixtures, is that amount effective to suitably terminate the polymerization system and achieve the level of reduced cold flow desired in the polymeric product obtained. The amount of hydride employed at the end of polymerization has no necessary upper limit since any excess at such stage can be separated during polymer recovery, although presently suggested for most purposes is a range of about 0.25 to 10 millimoles of hydride per 100 grams of monomer (mhm), presently preferred about 0.5 to 5 mhm.

Temperatures for the terminating or coupling process employing the hydrides according to the method and process of our invention can be as suitable or convenient. Temperatures of polymerization can be employed for the terminating reaction where desired, particularly where any portion of the hydride is added during polymerization. Exemplary terminating temperatures can be from about 0 to 100° C. or more, preferably between about 25 and 75° C. Time employed for the terminating reaction employing the hydrides according to our invention relates to the temperature at which the reaction is carried out. The time itself is not a limiting factor, but primarily a matter of convenience. Higher temperatures mean somewhat faster reaction rates. Lower temperatures are reflected by somewhat slower reaction rates. Typical times range from a few minutes up to several hours, such as three hours or more.

The hydride agents can be added to the polymerization reaction system in any convenient manner. These agents exist as normally gaseous products unless compressed as liquids. It is convenient to add the material or materials in the form of a gas by simply bubbling through the polymerization reaction mixture with such agitation as is suitable to provide homogenous dispersion of the gas in the liquid phase polymerization system without undue waste or loss. Of course, the additive also may be added to the polymerization system as a solution or dispersion, saturated or otherwise, in an inert diluent, such as the same diluent as employed for the polymerization reaction itself.

POLYMERIZATION PROCESS

The polymers which can be treated according to the method of our invention are polymers of conjugated dienes in a broad sense. The conjugated dienes can be polymerized to form homopolymers of any one conjugated diene, copolymerized one with another to form copolymers of any two thereof, or terpolymers of any three or more thereof, and the like. The conjugated diene polymers further includes copolymers of one or more conjugated dienes with one or more copolymerizable monovinyl-substituted aromatic hydrocarbons to form random or block copolymers.

Useful monomers include any polymerizable conjugated diene, which, of course, must have at least 4 carbon atoms per molecule. Most available of these are those of 4 to 12 or more carbon atoms per molecule, and most commercially available are those of 4 to 8 carbon atoms per molecule. Examples of such monomers include the presently preferred 1,3-butadiene, isoprene, and piperylene; as well as 2,4-dimethyl-1,3-butadiene, 1,3-octadiene, 4,5-diethyl-1,3-octadiene, and the like. Examples of other suitable monomers include vinyltoluene, styrene, 2-methylstyrene, any of the vinylnaphthalenes, 4-tertiarybutylstyrene, and the like.

The hydride shortstopping or terminating agents of this invention preferably are utilized to terminate polymerization reactions employing organometal/transition metal-compound catalyst systems. Such catalyst systems can be exemplified by (1) a catalyst system comprising an organometal compound which can be represented by the general formula $R_mM$ in which each R is an alkyl, cycloalkyl, aryl, alkaryl, aralkyl, alkylcycloalkyl or cycloalkylalkyl radical, M is aluminum, mercury, zinc, berylium, cadmium, magnesium, sodium or potassium, and $m$ is equal to the valence of the metal M, together with titanium tetraiodide; (2) a catalyst system comprising an organometal compound represented by the general formula $R_nM'$ in which each R is as defined above, M' is aluminum, magnesium, lead, sodium or potassium, and $n$ is equal to the valence of the metal M', together with titanium tetrachloride and titanium tetraiodide; (3) a catalyst system comprising an organometal compound represented by the general formula $R_aM''$ in which each R is as defined above, M'' is aluminum or magnesium, and $a$ is equal to the valence of the metal M'', together with a compound represented by the general formula $TiX_b$ in which each X is chlorine or bromine and $b$ is an integer of 2, 3, or 4, together with elemental iodine; (4) a catalyst system comprising an organometal compound represented by the general formula $R_xM'''$ in which each R is as defined above, M''' is aluminum, gallium, indium or thallium, and $x$ is equal to the valence of the metal M''', together with a titanium halide represented by the general formula $TiX_4$ in which each X is chlorine or bromine, together with an inorganic halide represented by the general formula $M^{iv}I_c$ in which $M^{iv}$ is beryllium, zinc, cadmium, aluminum, gallium, indium, thallium, silicon, germanium, tin, lead, phosphorus, antimony, arsenic, or bismuth, and $c$ is an integer of 2 to 5 inclusive; or (5) a catalyst system comprising an organometal compound represented by the general formula $R_xM'''$ in which R, M''' and $x$ are as defined above, together with titanium tetraiodide plus an inorganic halide represented by the general formula $M^vX_d$, wherein $M^v$ is aluminum, gallium, indium, thalium, germanium, tin, lead, phosphorus, antimony, arsenic or bismuth, X is chlorine or bromine, and $d$ is an integer of 2 to 5 inclusive. The R radicals of the aforementioned formulas presently preferably contain up to about 20 carbon atoms per R group.

The following are examples of the described catalyst systems which presently are preferred to be used to polymerize the describe monomers: triisobutylaluminum and titanium tetraiodide; triethylaluminum and titanium tetraiodide; triisobutylaluminum titanium tetrachloride and titanium tetraiodide; triethylaluminum, titanium tetrachloride and titanium tetraiodide; triisobutylaluminum, titanium tetrachloride and iodine; phenylsodium and titanium tetraiodide; n-butylpotassium and titanium tetraiodide; triphenyl aluminum and titanium tetraiodide; triphenylaluminum, titanium tetrachloride and iodine; diphenylmagnesium and titanium tetraiodide; triisobutylaluminum, titanium tetrachloride and aluminum triiodide; triethylaluminum, titanium tetrachloride, and phosphorus triiodide; triisobutylaluminum, titanium tetraiodide and tin tetrachloride; triisobutylaluminum, titanium tetraiodide and aluminum trichloride; and the like.

The amount of catalyst used can vary over a rather wide range, such as from 0.75 to 20 moles of the organometal used in the catalyst composition per mole of halogen-containing component, i.e., metal halide with or without a second metal halide or elemental iodine. While the mole ratios used in the polymerizations depend upon the particular components employed in the catalyst system, a presently preferred mole ratio is from 1:1 to 12:1 of organometal compound to halogen-containing component. When using a catalyst comprising an organometal compound and more than one metal halide, e.g., titanium tetrachloride and titanium tetraiodide, titanium tetrachloride or tetrabromide and aluminum iodide, the mole ratio of tetrachloride or tetrabromide to iodide usually is in the range of about 0.05:1 to 5:1. With a catalyst system comprising an organometal compound, a titanium chloride or bromide and elemental iodine, the mole ratio of titanium halide to iodine generally is in the range of about 10:1 to 0.25:1, presently preferably 3:1 to 0.25:1. The concentration of total catalyst sytsem, i.e., organometal plus halogen-containing component, usually is in the range of about 0.01 to 10, preferably of 0.01 to 5, weight percent, based on the total amount of monomers charged to the reactor system.

The process for preparing the polymers can be carried out at temperatures varying over a wide range. Exemplary temperatures include from about −100 to 250° F., presently preferred about −30 to 160° F. The polymerization reaction can be carried out under autogenous pressure, or at any pressure sufficient to maintain the reaction mixture substantially in the liquid phase. The pressure thus will depend upon the particular diluent employed as well as the polymerization temperatures. Higher pressures can be employed, if desired, employing, for example, a gas inert with respect to the polymerization reaction.

The polymerization processes can be carried out in the presence of a hydrocarbon diluent not deleterious to the catalyst system, including the presently preferred aromatic, as well as paraffinic and cycloparaffinic, hydrocarbons, alone or in admixture, particularly those containing from 4 to 12 carbon atoms per molecule, such as benzene, toluene, n-butane, isobutane, n-pentane, isooctane, n-dodecane, cyclopentane, cyclohexane, methylcyclohexane, and the like.

It is usually desirable, therefore, that the monomers, diluent, and reaction vessel, should be substantially free of materials which may tend to inactivate the catalysts, such as carbon dioxide, oxygen, and water.

POLYMER RECOVERY

After treatment of the polymerization system according to this invention, the polymer may be recovered by various means such as coagulation by the addition of a non-solvent to the terminated polymerization mixture. The polymer also may be recovered by steam stripping of the polymerization mixture in the presence of suitable dispersing agents which provides a rubber crumb for subsequent processing steps, such as drying, dewatering, and the like. Excess hydride quenching agent, if excess is employed, can be removed conveniently during such steam stripping operations, and therefore poses no particular problem in subsequent recycle of solvent or diluent or of unpolymerized monomer to the polymerization system. If desired, various processing steps may be taken to recover any excess hydride thus removed from the terminated polymerization mixture. The polymer recovered can be further processed in drying the baling operations for rubber production.

EXAMPLES

Examples provided demonstrate the effectiveness of the terminating agents and process of the invention. Particular components used and conditions employed are intended to be illustrative of the invention and not limitative of the reasonable and proper scope thereof.

Example I

Runs were made employing the polymerization recipe shown below, with some of the runs employing a hydride terminating agent according to this invention.

POLYMERIZATION RECIPE

| | Parts by wt. (or mhm.) |
|---|---|
| Toluene | 900 |
| 1,3-butadiene | 100 |
| Triethylaluminum TEA, mhm.[a] | (Variable) |
| Iodine $I_2$, mhm. | (0.3) |
| Titanium tetrachloride TTC, mhm. | (0.3) |
| Temperature, °C. | 30 |
| Time, hours | 1.5 |

Charge order: Toluene, $N_2$ purge, 1,3-butadiene, $I_2$, TEA, agitate 10 min. @ 30° C., TTC, polymerization time.

[a] mhm.=millimoles per hundred grams of monomer.

Runs 1 and 2 as control runs were terminated by the addition of a 10 weight percent solution of 2,2'-methylene - bis(4 - methyl - 6-tert-butylphenol), a conventional antioxidant, in a 50/50 by volume mixture of isopropyl alcohol and toluene with the amount added being sufficient to provide 1 part by weight of the antioxidant per 100 parts by weight of monomer (phm.). The terminated reaction mixtures from Runs 1 and 2 then were subjected to steam stripping to recover the polymer.

The polymerization reaction mixtures from Runs 3 and 4 of the invention each were treated at the end of the polymerization reaction period with 2 mhm. of sulfur hydride and then agitated for 1 hour at 70° C. Each reaction mixture then was admixed with the antioxidant solution as described above, and the polymers recovered by steam stripping as described above.

TABLE I

| Run No. | TEA, mhm. | H₂S, mhm. | Conv., percent | Viscosity Inherent[1] | Viscosity Mooney[2] | Cold flow mg./min.[3] | Cold flow Percent of standard[4] |
|---|---|---|---|---|---|---|---|
| 1 | 1.65 | 0 | 93 | 2.27 | 37.5 | 10.2 | 103 |
| 2 | 1.50 | 0 | 91 | 2.95 | 57.5 | 5.6 | 133 |
| 3 | 1.65 | 2 | 94 | 2.58 | 53.5 | 2.4 | 48 |
| 4 | 1.50 | 2 | 90 | 3.19 | 88.5 | 0.47 | 39 |

[1] Determined according to the procedure of U.S. Pat. 3,278,508, col. 20, notes a and b. Each polymer was gel-free.
[2] ASTM D 1646-63 ML-4 at 212° F.
[3] Cold flow determined by extruding the rubber through a ¼-inch orifice at 3.5 p.s.i. pressure and a temperature of 50° C. After allowing 10 minutes to reach steady state, the rate of extrusion is measured and reported in milligrams per minute.
[4] A percentage based on a standard cold flow value expected from the Mooney viscosity of the cis-polybutadiene sample and obtained from an arbitrary standard cold flow vs. Mooney viscosity curve. The arbitrary standard curve was established from polymerization runs employing triisobutylaluminum, iodine, and titanium tetrachloride in 1,200 phm. toluene at 5° C. for 2 hours.

The results of Table I demonstate that a much reduced rate of cold flow is obtained by employing sulfur hydride according to this invention in the termination of polymerization reaction mixtures. In addition to the reduced cold flow, the polymers from Runs 3 and 4 were noticeably desirably lighter color than the polymers of control Runs 1 and 2.

Example II

Another series of runs was conducted employing the polymerization recipe and polymerization conditions of Example I including using 1.65 mhm TEA in the polymerization recipe. Runs 7 to 9 employed variable amounts of $H_2S$ in a termination reaction of 60 minutes at 70° C. Control Runs 5 was terminated in the manner of Runs 1 and 2 of Example I. Control Run 6 was agitated at 70° C. for 60 minutes before antioxidant solution was added. Each polymer was recovered by steam stripping as in Example I. The results of these runs are presented in Table II.

TABLE II

| Run No. | H₂S, mhm. | Conv., percent | Viscosity Inherent | Viscosity Mooney | Cold flow Mg./min. | Cold flow Percent of standard |
|---|---|---|---|---|---|---|
| 5 | 0 | 95 | 2.35 | 38.5 | 9.1 | 100 |
| 6 | 0 | 100 | 2.32 | 41 | 5.4 | 55 |
| 7 | 4 | 96 | 2.52 | 51 | 2.3 | 38 |
| 8 | 2 | 96 | 2.42 | 47 | 1.9 | 27 |
| 9 | 1 | 96 | 2.46 | 47 | 2.4 | 34 |

The results in Table II again demonstrate that termination with a Group VI-A hydride according to this invention provides significant reduction in polymer cold flow. The reduction in cold flow in the runs of the invention is significantly greater than that obtained in Control Run 6 which was subjected to the same reaction conditions as Runs 7 to 9 but in the absence of the sulfur hydride.

Example III

Further runs were carried out employing variable reaction times and temperatures in the termination reaction with a hydride according to the invention. The polymerization recipe and the polymer recovery procedure were the same as those employed in Example II. The results of these runs are shown in Table III below.

TABLE III

| Run No. | Conv., percent | H₂S, mhm. | Temp., °C. | Time, min. | Viscosity Inherent | Viscosity Mooney | Cold flow Mg./min. | Cold flow Percent of standard |
|---|---|---|---|---|---|---|---|---|
| 10 | 89 | 0 | 30 | 10 | 2.37 | 41.5 | 9.9 | 110 |
| 11 | 89 | 0 | 30 | 20 | 2.47 | 45.5 | 6.6 | 90 |
| 12 | 91 | 0 | 30 | 60 | 2.32 | 39 | 9.7 | 92 |
| 13 | 78 | 2 | 30 | 10 | 2.18 | 32 | 12.5 | 83 |
| 14 | 84 | 2 | 30 | 20 | 2.18 | 35.5 | 9.3 | 74 |
| 15 | 92 | 2 | 30 | 60 | 2.33 | 48.5 | 3.4 | 51 |
| 16 | 96 | 0 | 70 | 10 | 2.24 | 35 | 10.0 | 77 |
| 17 | 95 | 0 | 70 | 20 | 2.23 | 35 | 9.1 | 70 |
| 18 | 98 | 0 | 70 | 60 | 2.15 | 35 | 10.2 | 79 |
| 19 | 91 | 1 | 70 | 10 | 2.38 | 43 | 7.8 | 91 |
| 20 | 90 | 2 | 70 | 10 | 2.50 | 44 | 3.9 | 44 |
| 21 | 85 | 2 | 70 | 20 | 2.42 | 46.5 | 3.2 | 44 |
| 22 | 85 | 2 | 70 | 60 | 2.43 | 47 | 2.9 | 41 |
| 23[1] | 88 | 0 | | 0 | 2.32 | 37.5 | 11.8 | 103 |

[1] Control run of the same type as Run 5, Example II.

The results in Table III again demonstrate the reduction in cold flow achieved by the process of this invention and further indicate the effect of temperature and time on the efficiency of the hydride termination reaction in reducing cold flow.

The polymers produced according to the invention can be compounded with fillers, extender oils, plasticizers, pigments, vulcanizing agents, antioxidants, and the like, for the compounding of rubbery polymers. The polymers are useful in the manufacture of tires, belting, gaskets, and the like, after being compounded and cured in rubber compounding recipes.

Reasonable variations and modifications of my invention are possible while still within the scope of our disclosure, and without departing from the intended scope and spirit thereof, as detailed in our specification and the claims appended.

We claim:

1. A polymerization process which comprises polymerizing at least one polymerizable monomer with an organometal/transition metal compound catalyst system under polymerization conditions, wherein said process employs a minor effective coupling amount of at least one Group VI-A hydride,
   wherein said Group VI-A hydride is sulfur hydride, selenium hydride, or tellurium hydride, said minor effective coupling amount is added after initiation of said polymerization system with said organometal/transition metal compound catalyst system, and prior to quenching of said polymerization process,
   and wherein said polymerizable monomer comprises at least one conjugated diene, or at least one conjugated diene and at least one monovinylsubstituted aromatic hydrocarbon.

2. The polymerization process according to claim 1 wherein said Group VI-A hydride is added to said polymerization system in the form of a gas, a liquid, or in the form of a solution of said hydride in an inert diluent.

3. The polymerization process according to claim 1 wherein said minor effective amount is at least about 0.25 mhm.

4. The polymerization process according to claim 3 wherein said hydride terminating agent is added at least in part during the polymerization process, after at least about 60 percent conversion of monomers has been obtained, or after substantially complete conversion of monomers has been obtained.

5. The polymerization process according to claim 4 wherein said polymerizable conjugated diene contains 4 to 12 carbon atoms per molecule, and said vinyl-substituted aromatic compound contains 8 to 16 carbon atoms per molecule, and said minor effective amount is about 0.25 to 10 mhm.

6. The process according to claim 5 wherein said Group VI-A hydride is added to said polymerization process at a temperature of about 0 to 100° C.

7. The polymerization process according to claim 6 wherein said polymerizing is conducted at a temperature of about −100 to +250° F., in the presence of at least one hydrocarbon diluent containing from about 4 to 12 carbon atoms per molecule.

8. The polymerization process according to claim 5 wherein said polymerizable monomer is butadiene, isoprene, butadiene and styrene, or isoprene and styrene, and said Group VI-A hydride is sulfur hydride.

9. The polymerization process according to claim 8 wherein said polymerizable monomer is 1,3-butadiene, said catalyst system comprises triethylaluminum, iodine, and titanium tetrachloride.

10. The polymers produced according to the process of claim 1.

11. The method according to claim 1 wherein said Group VI-A hydride is added to said polymerization reaction system in an amount to provide from about 0.5 to 10 mhm., and said hydride terminating agent is added after at least about 60 percent conversion of monomers has been obtained.

12. The process according to claim 1 wherein said Group VI-A hydride is selenium hydride.

13. The process according to claim 1 wherein said Group VI-A hydride is tellurium hydride.

References Cited
UNITED STATES PATENTS

| | | | |
|---|---|---|---|
| 3,205,215 | 9/1965 | Hsieh | 260—94.3 |
| 3,299,032 | 1/1967 | Rollman | 260—94.2 M |
| 3,317,503 | 5/1967 | Naylor | 260—94.3 |
| 3,627,740 | 12/1971 | Schafer | 260—94.3 |

JAMES A. SEIDLECK, Primary Examiner

U.S. Cl. X.R.

260—79.5 NV, 82.1, 94.3, 94.7 S